United States Patent
Uda et al.

(10) Patent No.: US 7,064,888 B2
(45) Date of Patent: Jun. 20, 2006

(54) OPTICAL TRANSMISSION EQUIPMENT FOR SUPPRESSING A FOUR WAVE MIXING AND OPTICAL TRANSMISSION SYSTEM

(75) Inventors: Tetsuya Uda, Yokohama (JP); Ryoichi Miyake, Yokohama (JP); Takeshi Nakada, Yokohama (JP); Yoshimasa Kusano, Yokohama (JP); Elichirou Takizawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/295,497

(22) Filed: Dec. 7, 2005

(65) Prior Publication Data

US 2006/0082869 A1   Apr. 20, 2006

Related U.S. Application Data

(63) Continuation of application No. 10/342,338, filed on Jan. 15, 2003, now Pat. No. 6,999,230.

(30) Foreign Application Priority Data

Feb. 12, 2002  (JP) .............................. 2002-033318

(51) Int. Cl.
*H04B 10/12* (2006.01)
(52) U.S. Cl. ....................................... 359/337
(58) Field of Classification Search ............... 359/337
See application file for complete search history.

(56) References Cited

U.S. PATENT DOCUMENTS

| | | | |
|---|---|---|---|
| 5,559,910 A | 9/1996 | Taga et al. | |
| 5,818,629 A * | 10/1998 | Kinoshita | ............... 359/337.11 |
| 5,995,275 A | 11/1999 | Sugaya | |
| 6,128,111 A | 10/2000 | Roberts | |
| 6,154,273 A | 11/2000 | Suzuki | |
| 6,323,993 B1 | 11/2001 | Hansen et al. | |
| 6,411,429 B1 * | 6/2002 | Tomofuji et al. | ........... 359/337 |
| 6,611,370 B1 | 8/2003 | Namiki et al. | |
| 6,657,779 B1 * | 12/2003 | Cavaliere et al. | ........ 359/341.4 |
| 6,697,558 B1 | 2/2004 | Hansen et al. | |
| 6,819,479 B1 * | 11/2004 | Islam et al. | ................. 359/337 |
| 6,819,828 B1 | 11/2004 | Takahashi et al. | |
| 2001/0036347 A1 | 11/2001 | Hansen et al. | |
| 2002/0181045 A1 | 12/2002 | Uda et al. | |

FOREIGN PATENT DOCUMENTS

JP    07-074699    3/1995

(Continued)

OTHER PUBLICATIONS

Fabrizio Forghieri et al., "Reduction of Four-Wave Mixing Crosstalk In WDM Systems Using Unequally Spaced Channels", IEEE Photonics Technology Letters, vol. 6, No. 6, Jun. 1994, pp. 754-756.

(Continued)

*Primary Examiner*—Jack Keith
*Assistant Examiner*—Eric Bolda
(74) *Attorney, Agent, or Firm*—McDermott Will & Emery LLP

(57) ABSTRACT

There is suppressed deterioration of transmission quality resulting from FWM light generated in the optical fiber of an optical transmission apparatus that performs wavelength division multiplex transmission. To suppress deterioration of the transmission quality due to the FWM light, the sender apparatus adjusts the intensity of wavelength-division-multiplexed light output to the optical fiber, according to a level of FWM crosstalk observed by receiver apparatus.

6 Claims, 8 Drawing Sheets

FOREIGN PATENT DOCUMENTS

| | | |
|---|---|---|
| JP | 08-097771 | 4/1996 |
| JP | 2001-217781 | 8/2001 |
| JP | 2002-368692 A | 12/2002 |

OTHER PUBLICATIONS

Noboru Takachio et al., "32 X 10 Gb/s distributed Raman amplification transmission with 50-GHz channel spacing in the zero-dispersion region over 640 km of 1.55-um dispersion-shifted fiber", 1999 Optical Fiber International Conference, Postdeadline Paper 9, pp. PD9-1-PD9-3.

J. Kani et al., "Interwavelength-Band Nonlinear Interactions and Their Suppression In Multiwavelength-Band WDM Transmission Systems", Journal of Lightwave Technology, vol. 17, No. 11, Nov. 1999, pp. 2249-2260.

* cited by examiner

OPTICAL TRANSMISSION EQUIPMENT FOR SUPPRESSING A FOUR WAVE MIXING AND OPTICAL TRANSMISSION SYSTEM

RELATED APPLICATION

This application is a continuation of application Ser. No. 10/342,338 filed Jan. 15, 2003 now U.S. Pat. No. 6,999,230.

BACKGROUND OF THE INVENTION

The present invention relates to an optical transmission apparatus which can suppress deterioration of transmission quality due to four wave mixing (FWM) generated in a wavelength division multiplexing optical transmission system using an optical fiber and an optical transmission system.

A wavelength division multiplexing (WDM) transmission system, which transmits a plurality of optical signals with different wave-lengths using a single optical fiber, has been put into actual use as a large capacity optical transmission system. An optical fiber amplifier (hereinafter referred to as optical amplifier) such as an erbium-doped fiber amplifier (EDFA) has a characteristic capable of amplifying a wide wavelength range in one operation. Therefore, the combination of WDM and the optical amplifier allows amplifying a plurality of optical signals with different wavelengths in one operation. Thus, economical and large capacity long distance transmission can be realized with a simple structure.

However, such a WDM light amplifying transmission system increases an optical input level to the fiber, so that a transmission characteristic deteriorates, e.g. due to a nonlinear effect. As examples of such nonlinear effects, deterioration of transmission quality may be due to cross phase modulation (XPM), FWM or stimulated Raman scattering (SRS).

The XPM effect deteriorates a transmission waveform because light signals of two waves or more input to the optical fiber are phase-modulated mutually and are influenced by chromatic dispersion of the optical transmission line. JP-A-07-074699 teaches that chromatic dispersion involved in the generation of the XPM can be suppressed by a chromatic dispersion compensator, which is appropriately disposed on the optical transmission line, and deterioration of waveforms can be avoided.

In a case of SRS, part of a wavelength-division-multiplexed signal light input to the optical fiber acts as excitation light and interacts with signal light of a low frequency in the fiber, and energy moves from the signal light of a high frequency to the signal light of a low frequency. Therefore, deviation of an optical signal-to-noise ratio (OSNR) may be caused depending on a waveband. However, when the intensity of the signal light of each wavelength to be input to the transmission line is appropriately controlled, the OSNR between wavelengths can be made uniform (e.g., Japanese Patent Application No. 2001-167609).

When input signal light having two or more multiplexed wave-lengths is input to the optical fiber, light is newly generated by the nonlinear optical effect, and FWM adds interference noise to the signal light. The FWM occurs in various types of optical fibers, and its intensity (FWM light intensity) depends on a type of optical fiber, an input intensity into the optical fiber, or an interval between wave-lengths of a signal acting as pump light. FWM light intensity increases in proportion to the number of wavelength division multiplexing accommodated wavelengths multiplexed in the optical fiber, so that the fiber. The light intensity of the resulting FWM interference increases as the number of frequencies included in the light by the WDM device increases and the input light intensity increases, resulting in noticeable deterioration of transmission quality. Furthermore, the number of relay points increases as the transmission distance becomes long, which results in more noticeable deterioration due to effects of an increased amount of FWM.

In the operating state of a conventional WDM apparatus, effects by the FWM interference were not so large because the number of wavelengths being multiplexed and the transmission distance were relatively small. In recent years, as network communication traffic increased, demand arose for an increase in the number of accommodated wavelengths and for increases in the transmission distance. Therefore, the effects by the FWM cannot be dismissed, and when the effects of the FWM become large, it becomes impossible to make transmission.

For a conventional transmission system using the WDM apparatus, a method of making a wavelength of light newly generated by the FWM not to agree with any signal light wavelength is described in Publication 1 (F. Forghieri, "Reduction of Four-Wave Mixing Crosstalk in WDM Systems Using Unequally Spaced Channels", IEEE Photonics Technology Letters, 6, pp. 754–756, 1994).

A method to decrease generation efficiency of the FWM by inputting excitation light to the transmission line and giving a distributed constant type Raman amplification gain to the signal light to reduce an input intensity of the signal light to the optical fiber is described in Publication 2 (N. Takachio, "32×10 Gbps distributed Raman amplification transmission with 50 GHz channel spacing in the zero dispersion wavelength region over 640 km of 1.55 µm dispersion shifted fiber", 1999 Optical Fiber International Conference, Postdeadline Paper 9) and JP-A-2001-217781.

A design method to minimize deterioration of transmission quality due to such a nonlinear effect is described in Publication 3 (J. Kani, "Inter-wavelength-band nonlinear interaction and their suppression in multi-wavelength-band WDM transmission systems", IEEE Journal of Lightwave Technology, vol. 17, November 1999). According to this method, when it is predicted that the transmission quality of signal light is deteriorated by FWM, a nonlinear interaction is decreased by arranging for the intervals between respective wavelengths to become unequal or by mutually propagating the signal lights in opposite directions in a single optical fiber. Thus, among the deteriorations in the transmission characteristics due to the above-described nonlinear effect, one especially resulting from the FWM is minimized. It is also disclosed in JP-A-08-097771 that the generation of the FWM light can be decreased by configuring a system to have an appropriate combination of chromatic dispersion values of the transmission fiber.

However, the technologies described in the above-described publications need an optical coupler and pump light for distributed Raman amplification, resulting in an increase in the system cost. Also, there is a possibility that deviation of the OSNR may be generated because signal light intensity deviation is generated for each wavelength. Besides Furthermore, the unequal interval disposition method of the Publication 3 has a problem in that it is not suitable for large capacity transmission of a large capacity because wavelength multiplex density is limited.

SUMMARY OF THE INVENTION

It is an object of the present invention to to suppress deterioration of trans-mission quality resulting from FWM generated in the optical fiber of an optical transmission apparatus which performs wavelength division multiplex trans-mission without unduly restricting wavelength division multiplex density.

The present invention observes the intensity of FWM generated in an optical fiber transmission line for each span at a receiver side and determines the intensity of output light that should be sent over the span by a sender side, in order to suppress deterioration of the transmission quality due to FWM generated in an optical fiber of a WDM optical transmission apparatus.

Other objects, features and advantages of the invention will become apparent from the following description of the embodiments of the invention taken in conjunction with the accompanying drawings.

BRIEF DESCRIPTION OF THE DRAWINGS

Embodiments of the present invention will now be described in conjunction with the accompanying drawings, in which.

DESCRIPTION OF THE EMBODIMENTS

Figure 1:
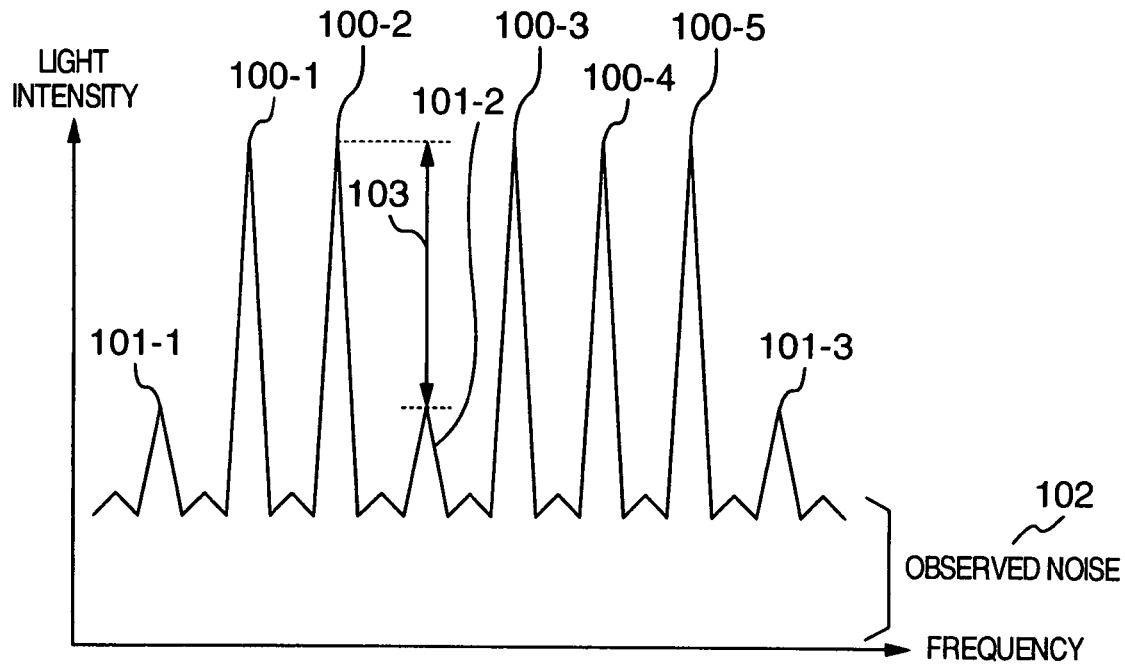
FIG. 1 is a spectrum illustrating FWM light and FWM crosstalk.

FIG. 1 is a diagram illustrating influence caused by the FWM. The horizontal axis indicates a frequency, and the vertical axis indicates light intensity. In the drawing, 100 (100-1 to 100-5) indicates the sum of signal light and noise light, 101 (101-1 to 101-3) indicates the sum of the generated FWM light and noise light, and 102 indicates noise light. A difference in light intensity between the signal light and its nearest FWM light generated is defined as the FWM crosstalk. For example, 103 indicates FWM crosstalk between the sum 100-2 of signal light and noise light and the sum 101-2 of FWM light and noise light.

The generation of the FWM light shown in FIG. 1 causes high input light intensity of wavelength-division-multiplexed light to an optical fiber and a narrow wavelength spacing. In other words, the generation of the FWM light after the optical fiber transmission becomes prominent when wavelength division multiplex density is higher, and the generated FWM light causes interference noise when it overlaps a signal light wavelength. And the generation of the FWM light largely depends on chromatic dispersion of the transmission fiber.

Figure 2:
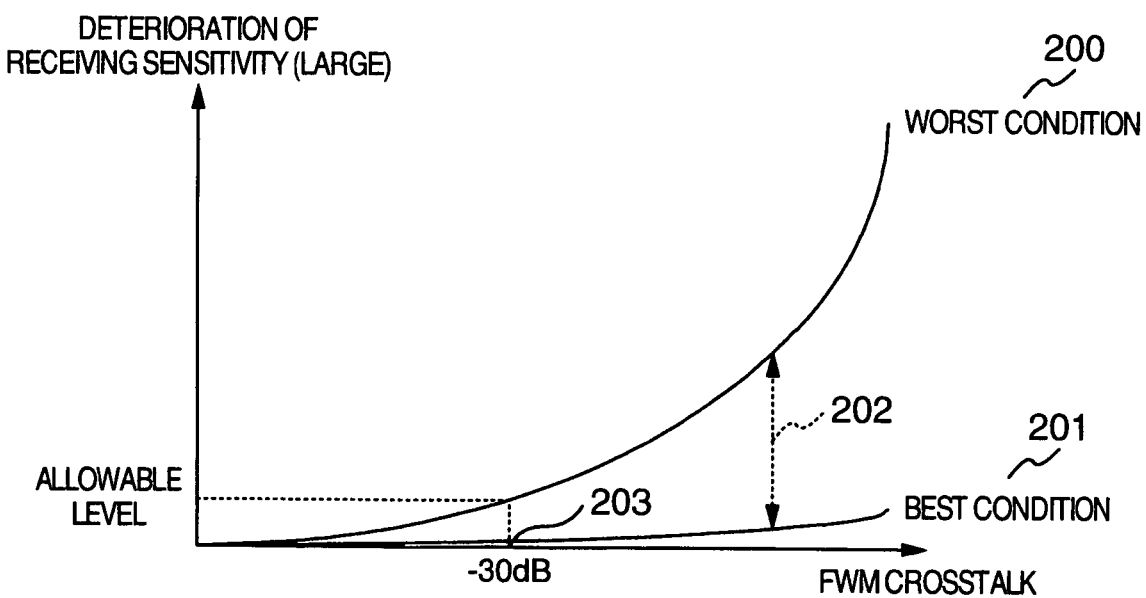
FIG. 2 is a diagram illustrating a relationship between FWM crosstalk and deterioration of receiving sensitivity.

FIG. 2 shows a relationship between the FWM and deterioration of transmission quality. The horizontal axis indicates an amount of FWM crosstalk, and the vertical axis indicates an amount of reception sensitivity deterioration caused by the FWM. Here, the deterioration of transmission quality due to the FWM largely depends on the phase and polarized state of a signal wavelength, which may also be variable with time, and the deterioration of transmission quality also varies with time. Therefore, even when the amount of FWM crosstalk is constant, the resulting deterioration of transmission quality may be variable. For example, 200 in FIG. 2 indicates the worst state of reception sensitivity deterioration, and 201 indicates the best state. And, 202 indicates a difference (varied amount) between the worst and best values of receiving sensitivity at the time of FWM crosstalk.

Figure 3:
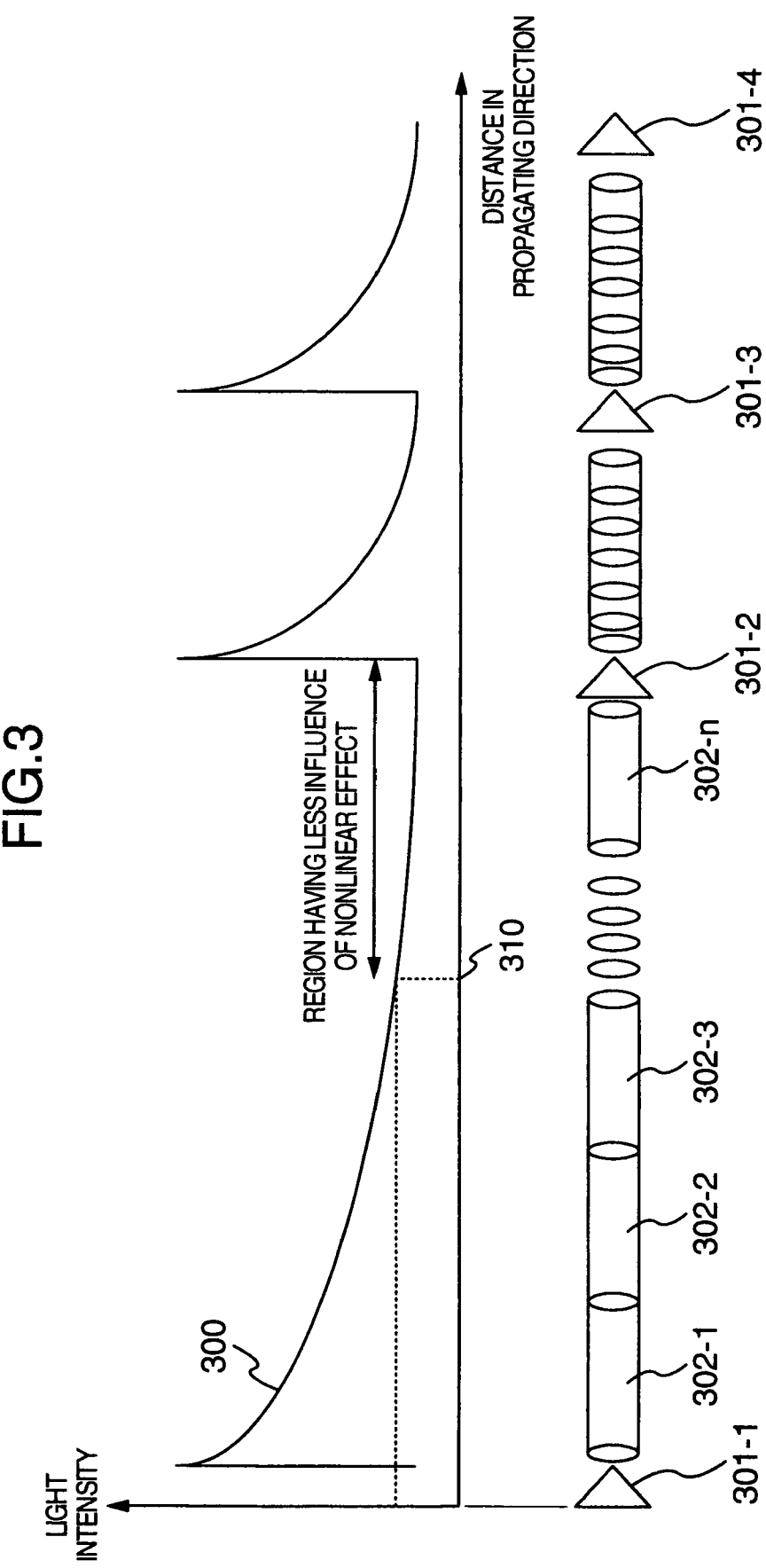
FIG. 3 is a diagram illustrating a relationship between a propagation distance and light intensity of an optical signal being transmitted through a fiber.

FIG. 3 is a diagram illustrating the chromatic dispersion of the optical fiber which has effects on the generated amount of FWM. The drawing also schematically shows an optical transmission line, which is formed of multiple amplifiers and optical fibers, and it graphs light intensities of the respective portions of the transmission line. The horizontal axis indicates a distance in a propagation axis direction, and the vertical axis indicates light intensity. Signal light intensity 300 is amplified by optical amplifiers 301 (301-1 to 301-4) which are disposed periodically in order to compensate light intensity lost in a transmission line 302.

The FWM light largely depends on the dispersion value of the optical fiber, but the dispersion value of the optical fiber is generally variable in the propagation axis direction. It is because, even when the transmission line has a distance of several hundreds kilometers between the amplifiers 302-1 and 301-2, it is actually configured by connecting multiple short fibers 302-1 to 302-$n$ of several kilometers, and the characteristics of the connected optical fibers are not uniform. Therefore, it is desirable to know a dispersion value of the transmission line to a point 310 toward which the signal light intensity 300 input to the fiber gradually attenuates and a nonlinear effect is finally lost.

When the dispersion value in the propagation axis direction is to be measured, sufficient accuracy has not been obtained yet. Even if the dispersion value in the propagation axis direction could be known, effective countermeasures cannot be taken because the transmission line itself has often been laid already.

Therefore, the present invention provides means which control the intensity of an input signal light into the optical fiber to sufficiently suppress deterioration in transmission quality due to the FWM involving variations with time, so that the FWM light generated after the propagation through the optical fiber has a constant amount.

Figure 4:
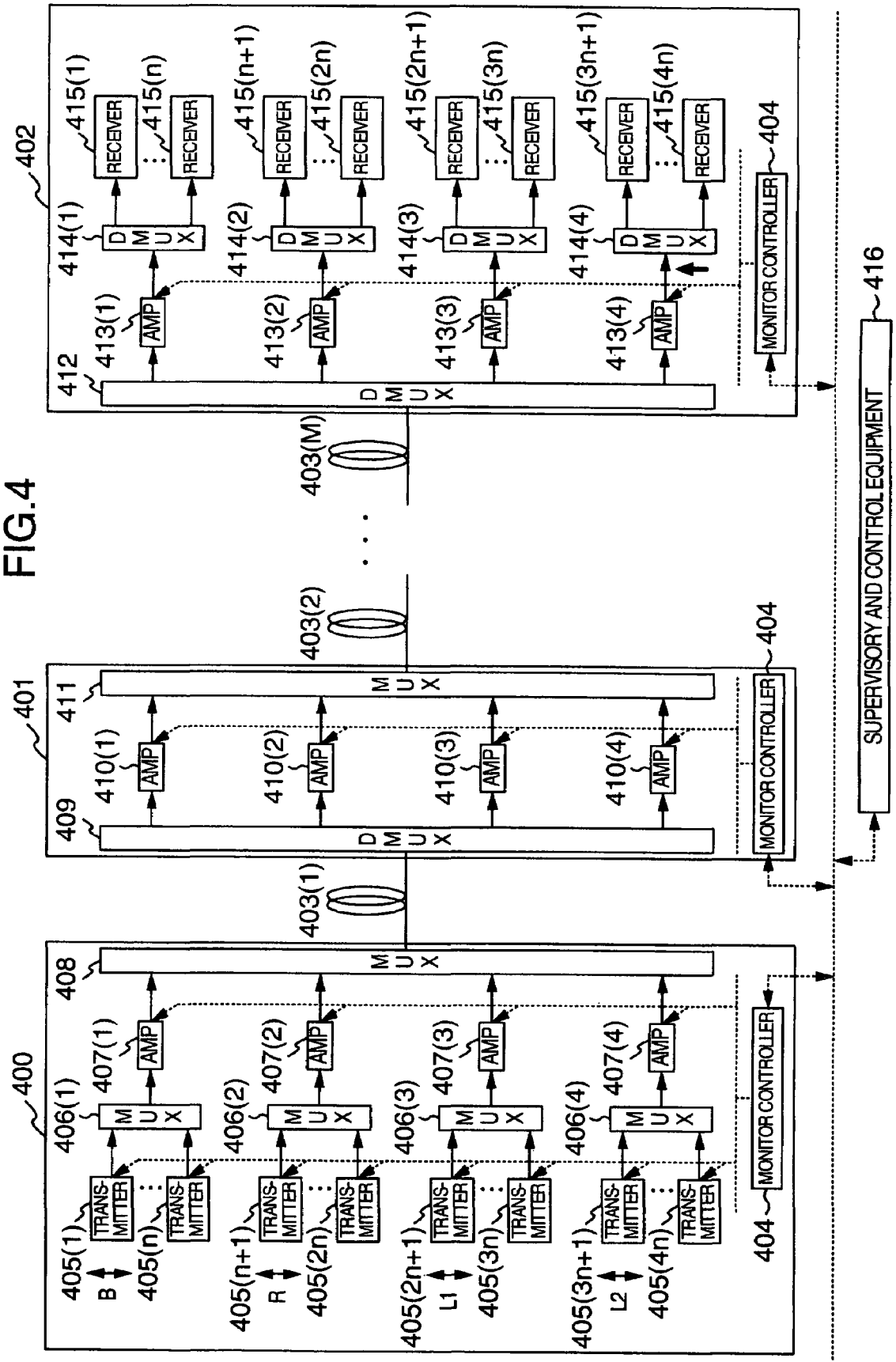
FIG. 4 is a block diagram showing a general structure of a wavelength division multiplexing transmission system.

FIG. 4 shows a basic structure of wavelength division multiplexing optical transmission system according to an embodiment of the present invention. In FIG. 4, 400 indicates an originating end office, 401 indicates a relay station, 402 indicates a receiving terminal station, and 403 indicates an optical fiber transmission line. Numeral 416 indicates supervisory and control equipment which is separately disposed in order to monitor and control the entire system. In this configuration, different optical amplifiers are disposed for amplification of four wavebands (1530 nm to 1545 nm, 1545 nm to 1560 nm, 1570 nm to 1585 nm, and 1585 nm to 1600 nm). The respective wavebands are referred to as the B band, the R band, the L1 band and the L2 band. It should be noted that optical signals with n separate wavelengths are multiplied and input to the respective optical amplifiers. Optical transmitters 405(1) to 405(n) of the originating end office 400 output optical signals with different wave-lengths within the B band. The output optical signals are wavelength-division-multiplexed by a wavelength multiplexer 406(1), amplified by a preamplifier 407(1) and input to a wavelength multiplexer 408. Similarly, signal lights with a wavelength of the R band output from the optical transmitters 405(n+1) to 405(2n) are wavelength-division-multiplexed and light-amplified by a wavelength multiplexer 406(2) and a preamplifier 407(2). Signal lights with a wavelength of the L1 band output from the optical transmitters 405 (2n+1) to 405(3n) are wavelength-division-multiplexed and light-amplified by a wavelength multiplexer 406(3) and a preamplifier 407(3). Signal lights with a wavelength of the L2 band are wavelength-division-multiplexed and light-amplified by a wavelength multiplexer 406(4) and a preamplifier 407(4). The wavelength multiplexer 408 wavelength-division-multiplexes the optical signals output from the respective preamplifiers 407(1) to 407(4) and outputs the multiplexed light to the optical fiber transmission line 403(1).

At the relay station 401, a wavelength de multiplexer 409 splits the input wavelength-division-multiplexed light into the four bands (B, R, L1, L2), and the split lights are amplified by respective line amplifiers 410(1) to 410(4) in order to compensate for transmission loss in the optical fiber 403(1) for each band. The optical signals resulting from the amplification are wavelength-division-multiplexed again by a wavelength multiplexer 411 and output to an optical fiber transmission line 403(2).

Then, the multiplexed optical signal is similarly light-amplified by a plurality of relay stations (not shown) and reaches the receiver terminal 402 through the final optical fiber span 403(M). In the receiver terminal 402, a wavelength demultiplexer 412 splits the input wavelength-division-multiplexed light into the four bands (B, R, L1, L2), and the split light signals are amplified for the individual bands by respective post-amplifiers 413(1) to 413(4). The amplified optical signals are split into individual light wavelength signals by individual optical demultiplexers 414(1) to 414(4) and received by respective optical receivers 415.

Figure 5:
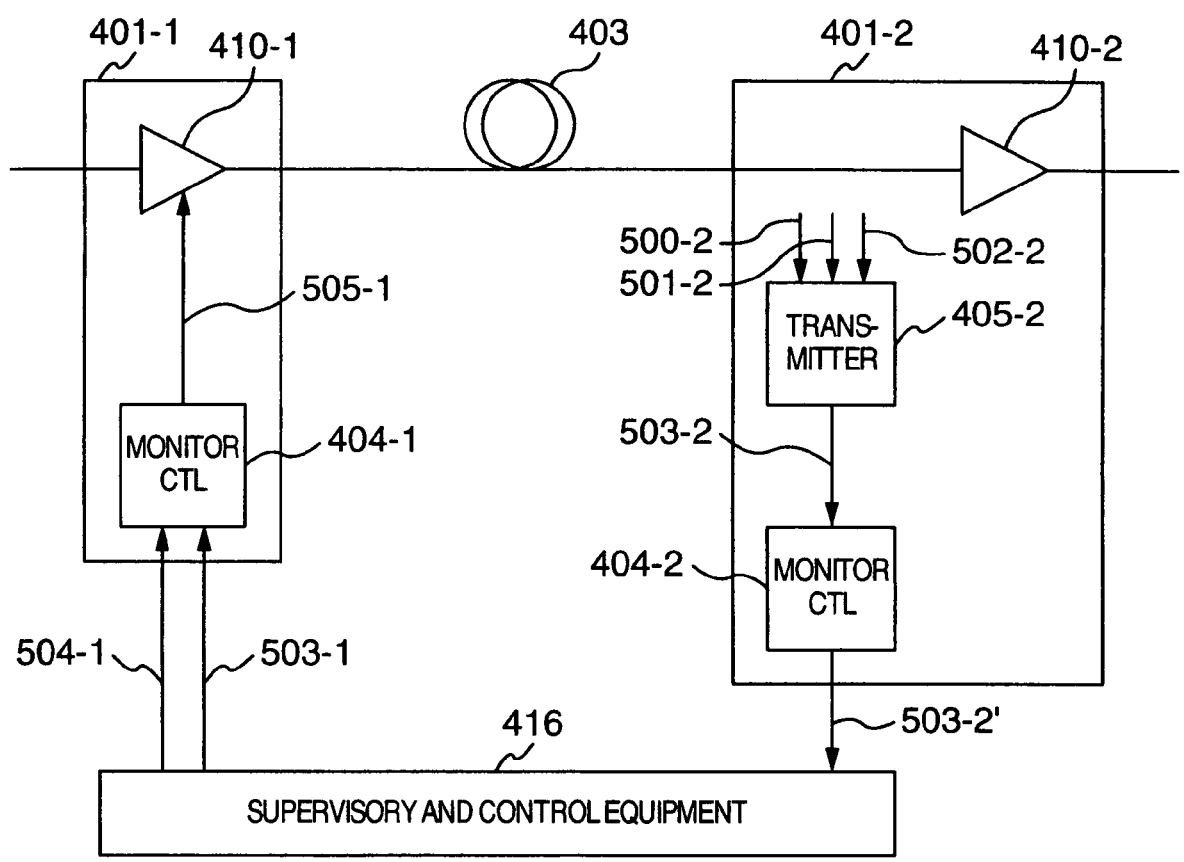
FIG. 5 is a basic structure diagram of an embodiment of the present invention.

Then, a method of suppressing deterioration of transmission quality due to the FWM will be described with reference to FIG. 5. FIG. 5 briefly shows minimum components and signals in order to illustrate a process of control performed between the optical amplifiers 410-1 and 410-2 within the optical transmission apparatuses 401-1 and 401-2 which are connected with the optical fiber 403. For example, the optical transmission apparatuses 401-1 and 401-2 and the optical amplifiers 410-1 and 410-2 correspond to the relay station 401 and optical amplifier 410(1) of FIG. 4, respectively.

FIG. 5 shows only one amplifier 410 in the optical transmission apparatus 401, but when a plurality of discrete amplifiers are used to amplify for respective bands as shown in FIG. 4, a control mechanism to be described below is disposed between the amplifiers for respective bands.

A specific control process will be described below.

(1) As shown in FIG. 2, variation characteristics of FWM crosstalk and deterioration of reception sensitivity are calculated theoretically or by experiment in advance. A theoretical calculation method is described in, for example, Publication 4 (Kyo. Inoue, "Crosstalk and Power Penalty Due to Fiber Four-Wave Mixing in Multichannel Transmissions", IEEE Journal of Lightwave Technology, vol. 12, August 1994).

(2) An allowable value of the FWM crosstalk at the receiving terminal is determined from the above characteristics. Specifically, an FWM crosstalk level 203 is determined as an allowable value considering deterioration of transmission quality due to the FWM and its variation with time. Here, it is specified as, for example, −30 dB in each of the optical receivers 415 shown in FIG. 4.

(3) The FWM crosstalk value (FWM (END)) at the receiving terminal specified above is divided by the number of relay spans (N), and an FWM crosstalk value (FWM (MID)) to be allotted to a single span is calculated by the following equation 1.

$$FWM(\text{MID}) = FWM(\text{END}) - 10 * \text{Log}(N) \tag{Eq. 1}$$

(4) In FIG. 5, the FWM(MID) 504-1, is calculated by the supervisory and control equipment 416 and allotted to each span. The calculated FWM(MID) 504-1 is sent to a supervisory and control section 404-1 in the sender apparatus 401-1.

(5) In the receiver apparatus 401-2, FWM light intensity 500-2, noise light intensity 501-2 and signal light intensity 502-2 generated while wavelength-division-multiplexed signal light is being transmitted through the optical fiber transmission line 403 are observed by a monitor mechanism (not shown) and sent to an arithmetic unit 405-2.

(6) The transmitter in FIG. 5 calculates an FWM crosstalk 503-2 from the received observed value by the equation 2 below.

$$FWM \text{ crosstalk [dB]} = (\text{signal light intensity} - \text{noise light intensity}) \text{ [dBm]} - (FWM \text{ light intensity} - \text{noise light intensity}) \text{ [dBm]} \tag{Eq. 2}$$

Equation 2 determines a difference between the signal light excluding the noise component and the FWM light as the FWM crosstalk, but it should be noted that it is calculated in decibel [dB].

(7) The calculated FWM crosstalk 503-2 is sent to the monitor and control equipment 416 via a monitor and control section 404-2 and further sent as 503-1 to the monitor and control section 404-1 of the sender apparatus 401-1.

(8) The supervisory and control section 404-1 compares the monitored FWM crosstalk 503-1 and the allotted FWM crosstalk 504-1 and sends an output level control signal 505-1 to the amplifier 410-1 so that the FWM crosstalk 503 matches an allowable value, namely the allotted FWM crosstalk 504-1. Here, the intensity of FWM light increases in proportion to the square of the input light intensity to the optical fiber on the sender side. Thus, it is possible to variably control the value of the FWM crosstalk by adjusting the output level of the sender amplifier 410-1.

By applying the above-described means (1) to (8) to sending and receiving stations and all relay stations, it is possible to suppress the FWM crosstalk at the final receiving station to the allowable value or below. But, it should be understood that the above-described means are based on the feedback control performed between the opposed apparatuses through the optical transmission line, so that unstable operation might be caused when, for example, any of the devices in the entire wavelength division multiplexing system as shown in FIG. 4 does not operate because of a failure or the like, or the FWM generated in the transmission line is extremely small or large.

Therefore, the system is configured so that the individual output light intensities are generally controlled to be made constant by the respective amplifiers 410, and when the FWM light is observed, the process proceeds to the above-described FWM crosstalk control operation.

The supervisory and control equipment 416 monitors the output light intensities determined by all the amplifiers 410 of the entire transmission system to make sure that the intensities are within a predetermined range. Thus, the operation of the system can be further stabilized.

Figure 6:
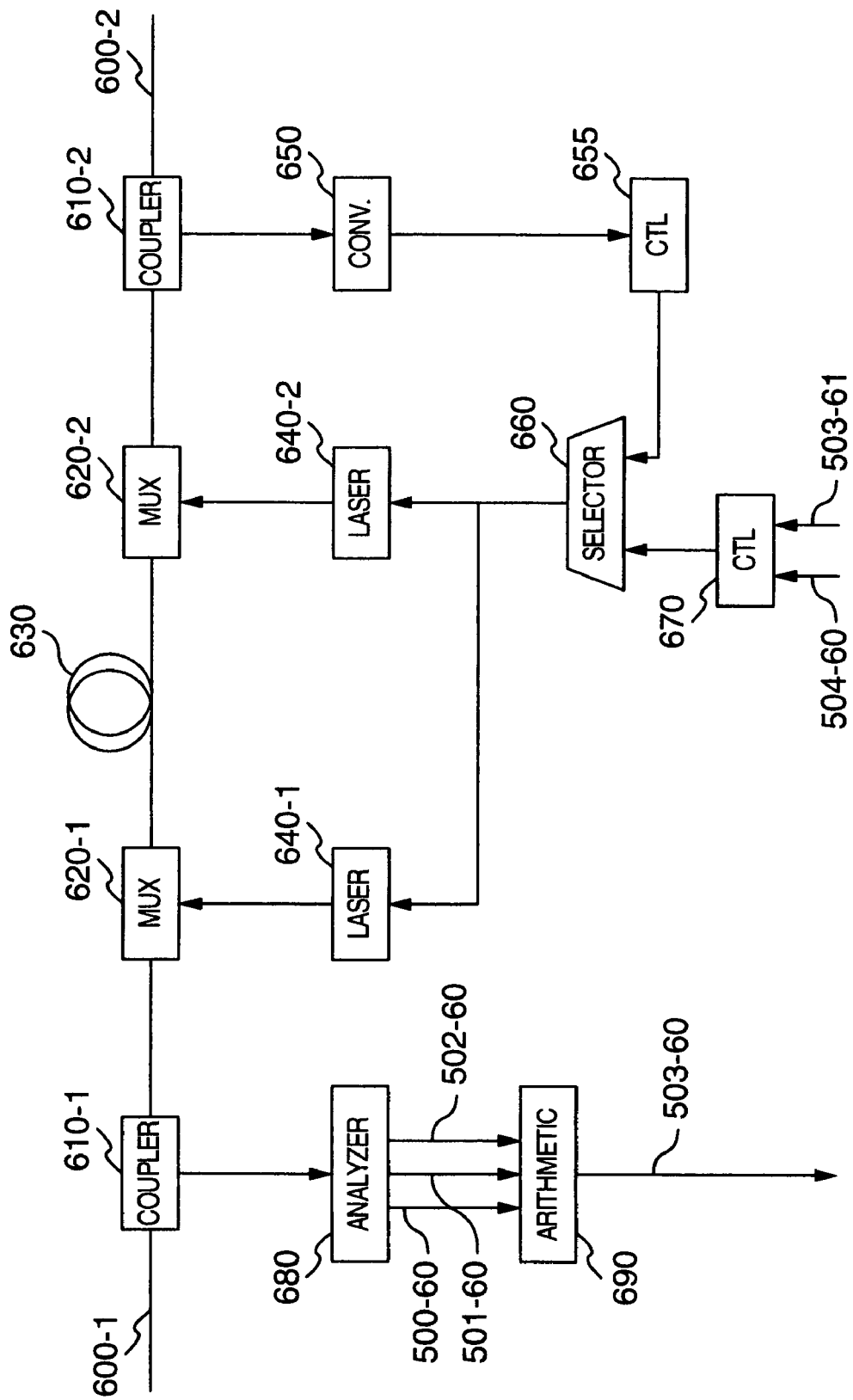
FIG. 6 is a structure diagram of the periphery of the optical amplifier according to an embodiment of the present invention.

FIG. 6 shows in detail the periphery of the optical amplifier of the optical transmission apparatus according to the above-described embodiment. Wavelength-division-multiplexed light received via an optical amplifier input section 600-1 is branched by an optical coupler 610-1, and FWM light intensity 500-60, signal light intensity 502-60, and noise light intensity 501-60 are observed by a wavelength analysis section 680. The wavelength analysis section 680 may be a commercially available photo-spectrum analyzer or the like for observing the above-described respective light intensities.

An arithmetic section 690 calculates FWM crosstalk 503-60 by Equation 2 and sends it to a transmission apparatus located upstream. In ordinary operation, the signal output from an optical amplifier 630 such as an erbium-doped fiber (EDF) is split by an optical coupler 610-2; and a portion thereof is converted into an electrical signal indicating the output light intensity by a light-to-electricity converter 650. Then, a drive signal is sent to excitation pump lasers 640-1 and 640-2 via an output light control section 655 and a selector 660, so that the intensity of the electrical signal comes to have a prescribed value. The excitation pump lasers 640-1 and 640-2 receive the drive signal and send suitable excitation light to the optical amplifier 630 via multiplexing sections 620-1 and 620-2 so as to perform output light intensity stabilizing control.

Here, when FWM crosstalk 504-60 of a prescribed amount or more is input from a downstream device, the above-described output intensity stabilizing control is switched to FWM crosstalk stabilizing control. Specifically, the drive signal is sent from an FWM control section 670 to an excitation pump laser 640 via the selector 660 so that the FWM crosstalk 503-60 and the allotted FWM crosstalk 504-60 agree with each other. Excitation light is input from the excitation pump laser 640 to an optical amplifier 630 via the multiplexing section 620 so to perform the above-described FWM crosstalk stabilizing control.

FIG. 6 shows a bi-directional excitation method which has the excitation pump lasers 640-1 and 640-2 disposed before and after the optical amplifier 630, but front excitation or rear excitation which has the excitation pump laser 640 disposed before or after the optical amplifier 630 may also be employed.

Figure 7:
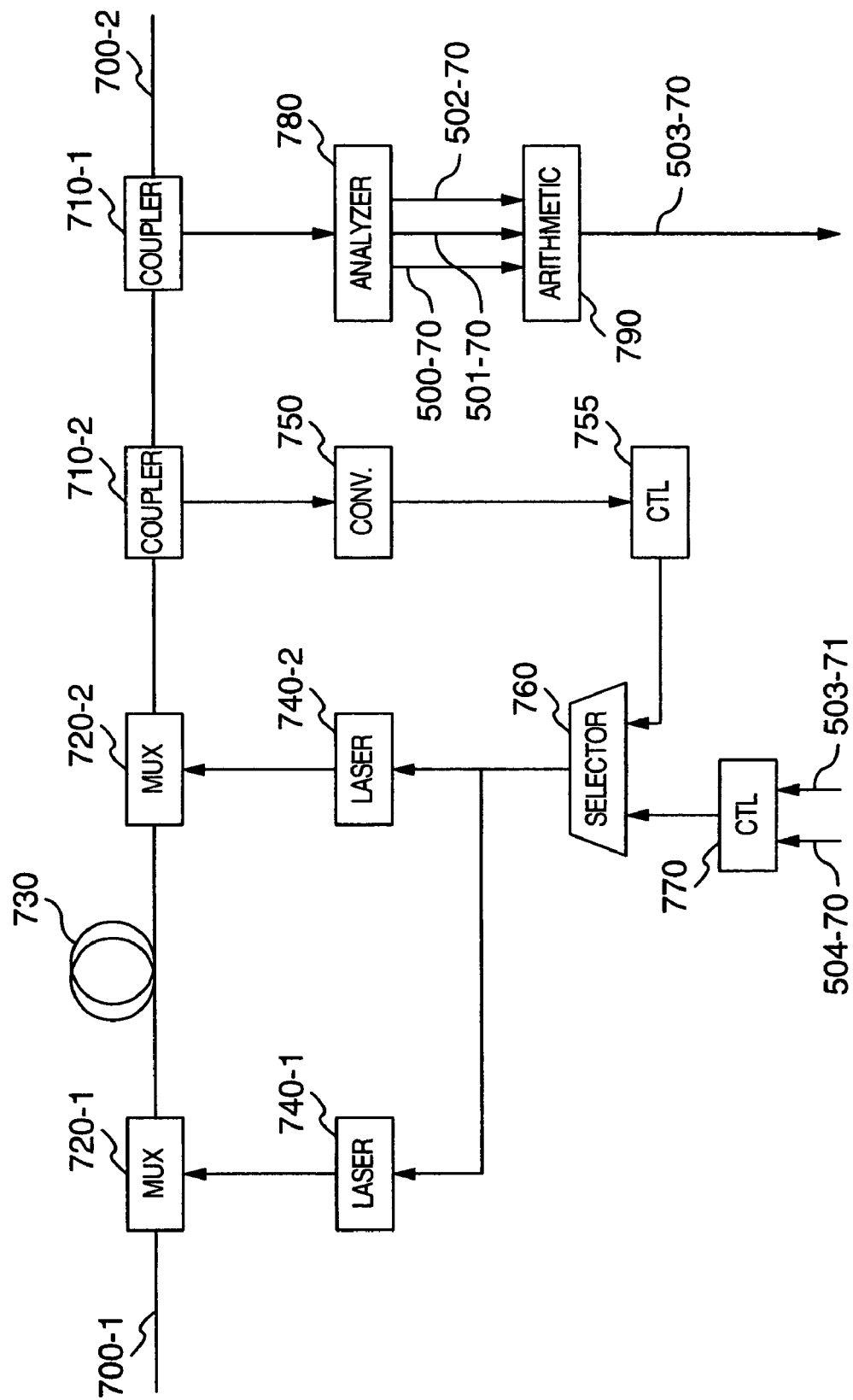
FIG. 7 is a structure diagram of the periphery of the optical amplifier according to an embodiment of the present invention.

The FWM crosstalk value mainly depends on an amount generated in the optical fiber used as the transmission line, and an amount generated by the optical amplifier can be substantially disregarded. Therefore, it is also possible to observe FWM using the signal amplified by the optical amplifier 630. Specifically, it is also possible to employ a structure in that a wavelength analysis section 780 and an arithmetic section 790 are disposed in the latter stage of an optical amplifier 730 as shown in FIG. 7.

Figure 8:
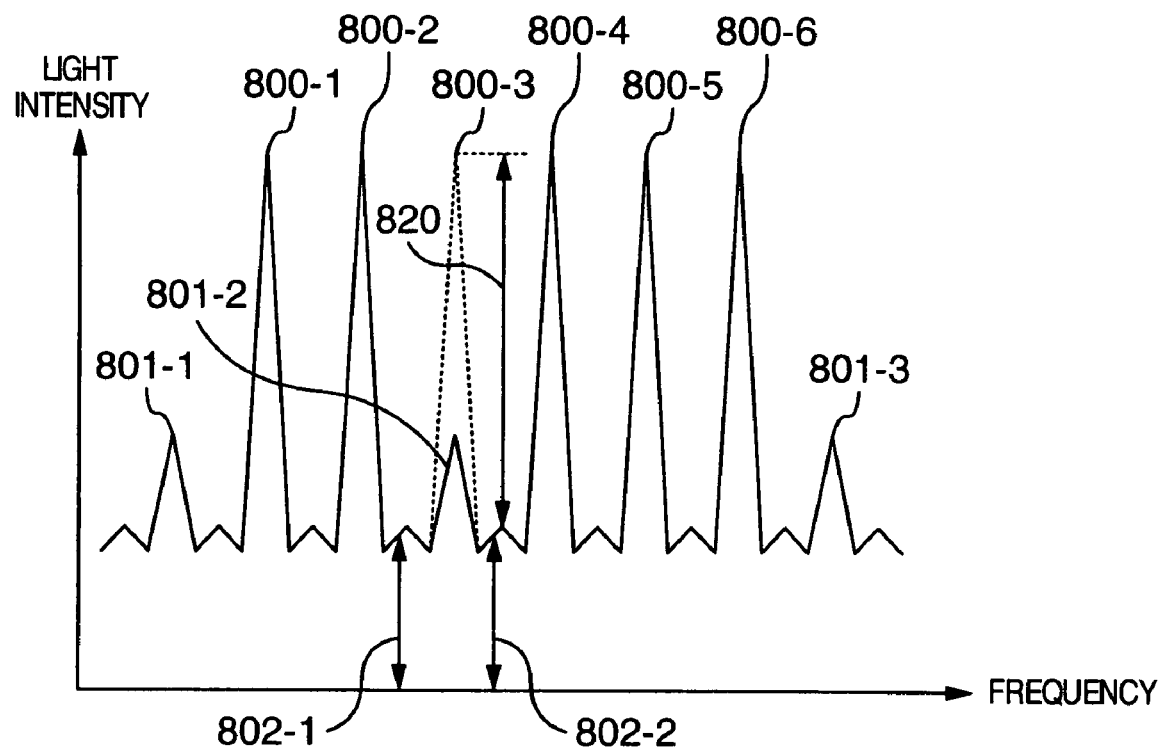
FIG. 8 is a diagram illustrating an observing method of FWM crosstalk according to an embodiment of the present invention.

Then, a specific observing method of various optical signal intensities in this embodiment will be described with reference to FIG. 8. In FIG. 8, 800 indicates signal light, 801 indicates FWM light, 802 indicates a noise level, the horizontal axis indicates a frequency, and the vertical axis indicates an optical signal intensity.

The FWM light is generated by interaction of a plurality of wavelength-division-multiplexed optical signals. Therefore, the quantity of generated light and the generated wavelengths are indefinite. Thus, when FWM light 801-2 is generated and overlaps with signal light 800-3 with the same wavelength as shown in FIG. 8, its presence can not be found, and its intensity can not be measured. Therefore, the respective signal lights 800 are turned off sequentially, and intensity of FWM light observed at that time is determined.

More specifically, the optical transmitters 405 shown in FIG. 4 are sequentially turned off one by one to perform measurement. For example, the intensity of the FWM light 801-2 observed when the signal light 800-3 having a given wavelength is turned off is measured. To measure the signal light intensity 800-3, the light transmitter is made to emit light. In practical observing, it is hard to know a noise component of the signal light 800-3 and the FWM light 801-2. Therefore, adjacent light intensities 802-1 and 802-2 on both sides, which are separated by, e.g., approximately ½, are measured, and their average value is read as noise light intensities of the optical signal 800-3 and the FWM light 801-2.

The above-described observation of the FWM light by turning off the optical signal is sequentially performed on all optical signals, and when the FWM light is observed, the FWM crosstalk amount is calculated by the above-described Equation 2. The above-described crosstalk averaging control is performed on the maximum FWM crosstalk among the calculated FWM crosstalk amounts. When an optical fiber input intensity is controlled by applying the same amount of control (attenuation or amplification) over the entire accommodating wavebands, it is possible to control operation in such a way that deviation is not generated for each wavelength. By previously setting target optical fiber input intensity so as to decrease an amount controlled by this algorithm as low as possible, the deviation between wavelengths generated by the controlling operation can be disregarded. Thus, the target wavelength, which was initially determined as a wavelength to provide the maximum FWM crosstalk, is not changed by the controlling operation. When the FWM crosstalk is analyzed according to the above-described algorithm in a state that where the number of wavelengths to be accommodated is many enough large (about five to six waves or more), an effect caused when light of the pertinent channel is turned off is smaller than that caused by another accommodation channel and can be disregarded.

To emit or turn off light, the above-described observing method needs to switch a particular optical transmitter among the optical transmitters 405 accommodated in the wavelength division multiplexing apparatus. Therefore, there is no problem when the apparatus is installed (set up or the like), but the above method cannot be used while operating as the system with the customer signal accommodated.

Figure 9:
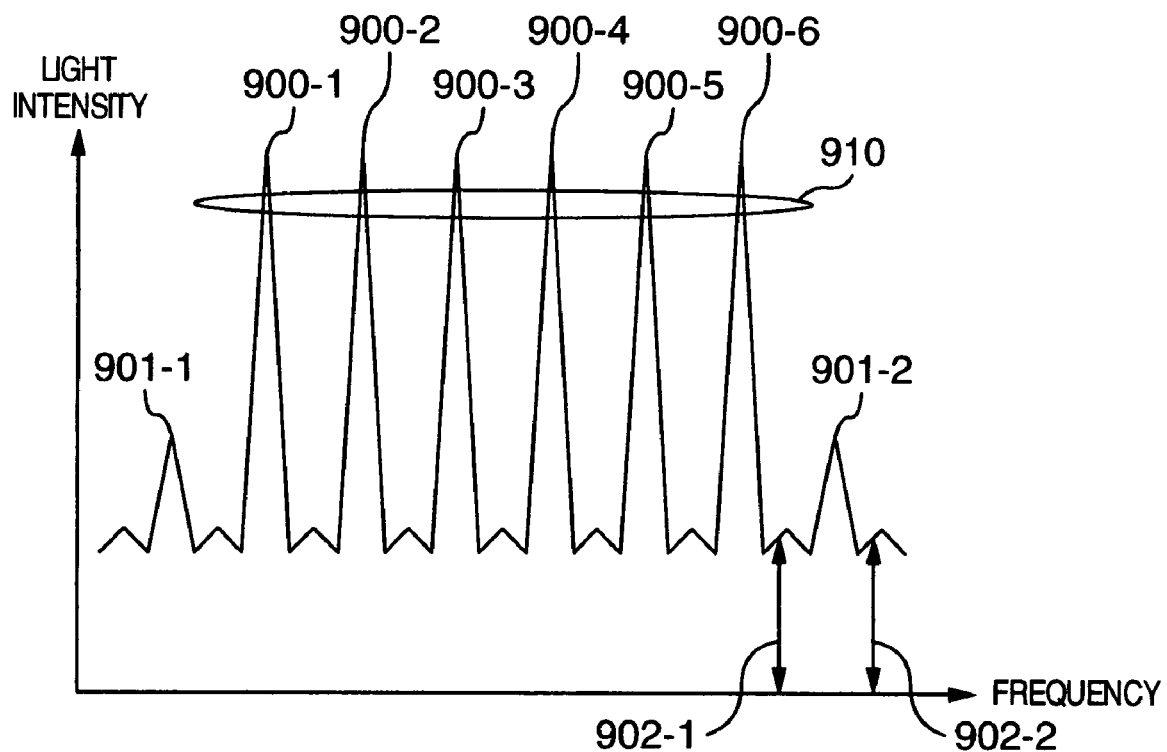
FIG. 9 is a diagram illustrating another observing method of FWM crosstalk according to an embodiment of the present invention.

Then, another observing method will be described with reference to FIG. 9. This observing method observes only FWM light 901-1 and 901-2 which are generated at both ends of a waveband 910 of the wavelength-division-multiplexed light accommodated in the optical amplifier. And, one with higher light intensity, namely 901-2, among them is determined as the FWM light to be controlled. For the signal light intensity, the signal light intensity of a signal wavelength 900-6 which is at the nearest position is observed. For noise light intensity, the average value of light intensities 902-1 and 902-2, which are separated from the FWM light 901-2 by ½ of the wavelength division multiplexing interval, is determined as a noise light intensity of the signal light 900-6 and the FWM light 901-2.

The above observing method observes some of the FWM light only. For the FWM crosstalk stabilizing control, the former observing method can be sometimes performed more accurately. However, the method discussed immediately above can be performed even when the system is operating because the procedure of turning off the optical transmitter 405 is not necessary.

As described above, deterioration of the transmission quality due to the FWM generated in the wavelength division multiplexing optical transmission system using the optical fiber can be suppressed by the present invention.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for transmitting an optical signal from a transmitter-side apparatus to a receiver-side apparatus via a plurality of relay apparatuses, comprising:
    notifying respective relay apparatuses of a first allowable value which is a difference between FWM (four wave mixing) light and signal light contained in the optical signal between adjacent relay apparatuses;
    measuring, by a first relay apparatus, the difference between the FWM light and the signal light contained in the optical signal, the difference being received from a second relay apparatus adjacent to the first relay apparatus;
    transmitting, by the first relay apparatus, the difference thus measured to the second relay apparatus; and
    adjusting, by the second relay apparatus, magnitude of the optical signal transmitted to the first relay apparatus so that the measured difference thus received coincides with the first allowable value notified.

2. The method according to claim 1, wherein the first allowable value is calculated by the following steps:
    determining a second allowable value which is a difference between FWM light and the signal light contained in the optical signal in said receiver-side apparatus, with respect to the optical signal transmitted from said transmitter-side apparatus to said receiver-side apparatus; and
    determining, as the first allowable value, a value obtained by dividing the second allowable value by a number of the relay apparatuses plus 1.

3. The method according to claim 1, wherein the second allowable value is determined based on a pre-calculated relationship between a degree of deterioration of reception sensitivity of the optical signal and the difference between the FWM light and the signal light.

4. The method according to claim 1, wherein the magnitude of the optical signal transmitted from the second relay apparatus to the first relay apparatus is adjusted by adjusting an output level of an optical amplifier of the second relay apparatus.

5. The method according to claim 1, wherein the magnitude of the optical signal transmitted to the first relay apparatus is adjusted by the second relay apparatus when the first relay apparatus observes the FWM light equal to or greater than a predetermined magnitude.

6. The method according to claim 1, further comprising the step of monitoring whether or not the magnitude of the optical signal transmitted from the second relay apparatus to the first relay apparatus falls within a predetermined range.

* * * * *